(12) United States Patent  
Welter et al.

(10) Patent No.: US 7,107,768 B2  
(45) Date of Patent: Sep. 19, 2006

(54) HYDRAULIC SYSTEM

(75) Inventors: Roland Welter, Buehl (DE); Urban Panther, Seelbach (DE); Wolfgang Sulger, Buehl (DE); Matthias Zink, Ottenhoefen (DE); Dirk Kluender, Buehlertal (DE); Markus Hausner, Karlsruhe (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 21 days.

(21) Appl. No.: 10/705,050

(22) Filed: Nov. 10, 2003

(65) Prior Publication Data

US 2004/0168439 A1    Sep. 2, 2004

(30) Foreign Application Priority Data

Nov. 12, 2002   (DE) ................... 102 52 408

(51) Int. Cl.  
*F01B 7/08*   (2006.01)
(52) U.S. Cl. ........................... 60/533; 92/163
(58) Field of Classification Search ............. 60/533; 92/163  
See application file for complete search history.

(56) References Cited

U.S. PATENT DOCUMENTS 4,162,616 A * 7/1979 Hayashida .................. 60/533
4,631,212 A * 12/1986 Shifflett et al. ............. 285/330
5,918,913 A *  7/1999 Lewis et al. ................ 285/330
6,446,436 B1    9/2002 Winkelmann et al. ........ 60/533
2001/0035327 A1* 11/2001 Itoh ............................ 60/533

FOREIGN PATENT DOCUMENTS

DE        10049913        4/2001

* cited by examiner

*Primary Examiner*—F. Daniel Lopez  
(74) *Attorney, Agent, or Firm*—Davidson, Davidson & Kappel, LLC (57) ABSTRACT

The present invention relates to a hydraulic system, in particular for motor vehicles, including a master cylinder having a housing, a piston which is axially movably disposed therein, which bounds a pressure chamber filled with a hydraulic fluid, and which, upon actuation of the master cylinder, is axially moved by a piston rod acting upon the piston, thereby pressurizing the hydraulic fluid; further including a slave cylinder and a pressure-medium line connecting the cylinders; the master cylinder having an adapter for detachable connection to the pressure-medium line. The objective of improving the connection between the pressure-medium line and the adapter is achieved in that the adapter includes a sleeve made of a metal.

16 Claims, 10 Drawing Sheets

HYDRAULIC SYSTEM

Priority to German Patent Application No. 102 52 408.4, filed Nov. 12, 2002 and hereby incorporated by reference herein, is claimed.

BACKGROUND INFORMATION

The present invention relates to a hydraulic system, in particular for motor vehicles, including a master cylinder having a housing, a piston which is axially movably disposed therein, which bounds a pressure chamber filled with a hydraulic fluid, and which, upon actuation of the master cylinder, is axially moved by a piston rod acting upon the piston, thereby pressurizing the hydraulic fluid; the system further including a slave cylinder and a pressure-medium line connecting the cylinders, the master cylinder having an adapter for detachable connection to the pressure-medium line.

A hydraulic system of this type is known, for example, from German Patent Application No. 100 49 913 A1, which is related to U.S. Pat. No. 6,446,436. Both of these documents are hereby incorporated by reference herein In a prior art hydraulic system, the connection between the adapter and the pressure-medium line is problematic. If plastic is used for the adapter, leaks can occur, or a high assembly force may be required.

BRIEF SUMMARY OF THE INVENTION

An object of the present invention to improve the connection between the pressure-medium line and the adapter.

The present invention provides a hydraulic system, in particular for motor vehicles, that includes a master cylinder having a housing, a piston which is axially movably disposed therein, which bounds a pressure chamber filled with a hydraulic fluid, and which, upon actuation of the master cylinder, is axially moved by a piston rod acting upon the piston, thereby pressurizing the hydraulic fluid. The system further includes a slave cylinder and a pressure-medium line connecting the cylinders, the master cylinder having an adapter for detachable connection to the pressure-medium line. The adapter includes a sleeve made of a metal.

In this context, the sleeve can be manufactured from brass, aluminum, steel, or the like. The sleeve can be produced by turning, punching, deep drawing, or other known manufacturing processes. In this context, "sleeve" is understood to mean any type of insert on the inner side of a bore or the like.

In an advantageous embodiment, the sleeve may have, at least partially, a polygonal outer cross-section which fixes the sleeve against rotation in a bore of a housing flange. In this context, a "polygonal cross-section" is understood to include, for example, also an elliptical cross-section or a cross-section having rounded corners. In this connection, the corresponding housing opening or bore can already be made to match the outer contour of the sleeve. Alternatively, for example, circular bores or stepped bores are also possible, the sleeve being pressed into the circular or stepped bore so that the polygonal inner cross-section of bores is formed only by pressing-in the sleeve. The housing projection can be located at any point on the master cylinder. For example, it can also be located within the imaginary extension of the piston. The polygonal outer cross-section of the sleeve may prevent rotation of the sleeve about its longitudinal axis due to a corresponding inner cross-section of the bore of the housing projection. Preferably, the inner cross-section of the sleeve has a circular shape matching the outer cross-section of a corresponding connector of the pressure-medium line. The connection between the sleeve and the connector of the pressure-medium line can be secured in known manner by a clamp or the like.

In a further advantageous embodiment, provision may be made for the sleeve to have a first region and a second region with at least the first region and/or the second region having a polygonal outer cross-section. The adapter then may have a stepped bore including a first step corresponding to the first region, and a second step corresponding to the second region. Thus, the sleeve has a polygonal cross-section only over part of its depth. The polygonal cross-section can also be provided in the form of a knurling near the upper or lower side of the sleeve. It is advantageous if the second region has a smaller diameter than the first region because the associated seal cross-sections can thus be minimized.

In a further advantageous embodiment, the stepped bore may have, at least partially, a polygonal bore cross-section. In another advantageous embodiment, the first region may have a polygonal outer cross-section and the second region may have an essentially round outer cross-section. Thus, a fit between two circular sections that is quite easy to seal can be obtained in the region of smaller diameter.

In another alternative embodiment, the first region may have an essentially round outer cross-section and the second region may have a polygonal outer cross-section.

In a further advantageous embodiment, provision may be made for the sleeve to be sealed from the environment by an annular seal. In this context, the annular seal can be located in a circumferential annular groove of the sleeve. The annular seal can be a conventional O-ring, a seal having, for example, a trapezoidal oval cross-section. The seal is preferably circumferential in design.

In another advantageous embodiment, provision may be made for the adapter to be located laterally on the housing. Thus, it is possible to reduce the overall length of the master cylinder.

In a further advantageous embodiment, the sleeve may be fixedly and/or detachably connected to the housing. Therefore, the sleeve can, for example, be pressed in or glued in. Alternatively or additionally, provision may be made for undercuts which retain the sleeve in the manner of a clip connection.

Moreover, in a hydraulic system according to the prior art mentioned at the outset, the problem arises that pressure vibrations within the hydraulic system are directly transmitted, for example, to an actuating pedal.

It is therefore an alternate or additional object of the present invention to provide a hydraulic system in which pressure vibrations within the hydraulic system are not, or only to a lesser extent, transmitted to an actuating element such as an actuator, or a clutch pedal, or the like.

The present invention also provides a hydraulic system, in particular for motor vehicles, that includes a master cylinder having a housing, a piston which is axially movably disposed therein, which bounds a pressure chamber filled with a hydraulic fluid, and which, upon actuation of the master cylinder, is axially moved by a piston rod acting upon the piston, thereby pressurizing the hydraulic fluid. The system further includes a slave cylinder and a pressure-medium line connecting the cylinders, in which hydraulic system at least one damping element is located between the actuating device and the slave cylinder. The damping element can be any type of coupling element which allows vibrational isolation or which allows damping of transmitted vibrations.

In an advantageous embodiment, provision may be made for the piston rod to include a damping element located directly at a connecting piece. The connecting piece connects the piston rod to an actuating element, such as an actuator or a clutch or brake pedal. By arranging the damping element directly at the connecting piece, it is possible to minimize the required length of the piston rod.

In another advantageous embodiment, provision may be made for the damping element to include a first damper element, which is connected to the connecting piece, as well as a second damper element, which is connected to the piston rod. In this context, it is particularly advantageous if the first damper element and/or the second damper element is/are made of plastic. Manufacture from plastic of the damper elements typically is more cost-effective than manufacturing such components from metal, and, in addition, the mass of the damping element typically may be reduced.

In a further advantageous embodiment, the damping element may include a damping cushion, and that the first damper element is axially movable relative to the second damper element against the damping cushion. The damping cushion may be composed of a highly damping material, preferably of a rubber-elastic material. Thus, the first and second damper elements form a kind of a movable housing which accommodates the damping cushion.

In another advantageous embodiment, provision may be made for the first damper element to include a first region encompassing the damping cushion, and a second region supporting the connecting piece. Thus, the first damper element is divided into two functional regions. The first region advantageously may have a cup-like shape.

In a further advantageous embodiment, provision may be made for the piston rod to have a pin which extends at least partially into a bore of the second region. The pin serves to mechanically stabilize the second region. This is important especially if the second region is made of plastic because when the master cylinder is actuated through the piston rod, and thus also through the damper element and the connecting piece, bending forces and, in particular, buckling forces resulting from the compressive force have to be transmitted, which could overload the connecting piece if it is manufactured from plastic. Thus, the flexural stiffness and, in particular, the buckling strength of the components that are made of plastic are increased to such an extent that the risk of failure due to kinking, shearing off, or the like, is reduced.

In another advantageous embodiment, provision may be made for the pin to be arranged in the bore in such a manner that it can move in an axial direction. Therefore, the pin does not hinder the damping function.

In a further advantageous embodiment of the present invention, the damping element may be located in the pressure-medium line between the master cylinder and the slave cylinder. Thus, pressure vibrations can be damped before they reach the master cylinder.

The damping element may be advantageously configured as a disk, it also being possible to arrange a plurality of such disks behind one another to increase the damping effect in this manner. This may be achieved in that the disk is provided at its front side with a spline reaching from outside to a predefined inner diameter, and in that the surface of the disk is provided with a plurality of annular grooves to form ridges, these ridges alternately ending at the spline or being spaced apart therefrom. In this manner, the hydraulic fluid is positively guided through the grooves, the guiding direction being reversed at the ends of the ridges.

A bore provided in the outermost groove of the disk and connected to the pressure line allows the hydraulic fluid to enter the damping element. The exit of the hydraulic fluid is via the bore that is located at the end of the circular groove and also connected to a pressure-medium line.

In place of a plurality of disks arranged one behind the other, damping can also be accomplished by a labyrinth body in order to achieve optimum damping of the pressure vibrations. The labyrinth body may be composed of a cylindrical housing in which is located a cylinder provided with bores extending in an axial direction. The cylinder then may be sealed against the surrounding housing with seals, the housing being closable with a cover. The cover and the cylinder are provided with suitable bores allowing connection to the pressure lines.

Advantageously, in each case two bores in the cylinder may be connected alternately at the end faces. The remaining ridges form a part of a circular arc and are predominantly arranged circularly. In this context, the hydraulic fluid is positively guided within the cylinder, just as in the case of the disk. Due to the multitude of paths created in this manner, the hydraulic fluid, which is acted upon by pressure vibrations, is damped over the path from the inlet to the outlet of the cylinder. In this context, the size of the labyrinth body can be adapted, on the one hand, to the structural conditions in the vehicle space and, on the other hand, to the magnitude of the pressure vibrations.

A further advantage is that the two damping elements, the disk and the labyrinth body, can be made of plastic, metallic or nonmetallic material.

In a further embodiment of the present invention, the damping element may be composed of a combination of a pulsation filter and at least one throttle. This has the advantage that the vibration-carrying fluid flow can be controlled as a function of pressure. Thus, the fluid flow can either pass only through the throttle or, additionally, through the pulsation filter.

In order to increase the hydraulic stiffness of the master cylinder, it is known to manufacture the pressure chamber from metal, for example, in the form of a cylinder sleeve inserted into the plastic housing. In this context, it is problematic to fix the cylinder sleeve in position.

Another alternate or additional object of the present invention to provide a hydraulic system of the type mentioned at the outset, in which the cylinder sleeve is fixed in position more effectively.

The present invention provides a hydraulic system, in particular for motor vehicles, that includes a master cylinder having a housing, a piston which is axially movably disposed therein, which bounds a pressure chamber filled with a hydraulic fluid, and which, upon actuation of the master cylinder, is axially moved by a piston rod acting upon the piston, thereby pressurizing the hydraulic fluid. The system further includes a slave cylinder and a pressure-medium line connecting the cylinders, in which hydraulic system the master cylinder includes a replenishing nozzle which, on the side facing the piston in the installed position, has a projection which reaches behind a cylinder sleeve in the radial direction thereof. Thus, the cylinder sleeve can only be pulled out when the replenishing nozzle is not mounted. This is important especially when it is necessary to transport a partially assembled housing. When the replenishing nozzle is mounted immediately after mounting the cylinder sleeve, then the position of the cylinder sleeve can no longer be changed in an axial direction, even if the piston and the weld ring are not installed. However, a change in position in an axial direction is therefore not possible in a completely assembled condition either. Thus, the projection also serves to fix the cylinder sleeve in the installed position, that is, when the master cylinder is completely assembled. Therefore, no further measures are required to fix the cylinder sleeve in the axial direction.

In a further advantageous embodiment, provision may be made for the cylinder sleeve to include a radially enlarged collar. In this context, it is particularly advantageous if the projection extends to the inside diameter of the collar in a radial direction with respect to the axis of rotation of the piston, leaving a gap between the piston and the projection. Thus, direct contact of the projection with the piston is prevented even in the case of large manufacturing tolerances of the projection.

In another advantageous embodiment, provision may be made for the cylinder sleeve to be asymmetrical in shape at least at its front end. For this purpose, the cylinder sleeve can have a nose at its front end, the nose engaging in a corresponding recess of the housing.

An asymmetrical design can be achieved, for example, with a shape similar to a tube that is cut at an angle. In this context, it is only important that the cylinder sleeve have a shape which, together with a matching recess of the housing, prevents rotation of the cylinder sleeve about the longitudinal axis. The anti-rotation feature ensures that breather ports or breather grooves or the like provided in the cylinder sleeve are not changed in position with respect to a replenishing chamber or nozzle. Thus, the breather ports remain in the region of the replenishing chamber or replenishing nozzle and cannot be rotated relative thereto.

In a further advantageous embodiment, the position of the projection with respect to the longitudinal axis of the slip socket may be on the side of the slip socket facing away from the pressure chamber. In other words, the cylinder sleeve completely covers the replenishing port so that the breather clearance can be determined by the cylinder sleeve and the length thereof or the arrangement of the breather ports or breather grooves.

The aforementioned objects may be achieved by a master cylinder having one of the above features relating to the master cylinder, and by a hydraulic system having one of the features described in the present specification.

BRIEF DESCRIPTION OF THE DRAWINGS

Exemplary embodiments of the present invention are described in more detail below with reference to the accompanying drawings, in which.

DETAILED DESCRIPTION

Figure 1:
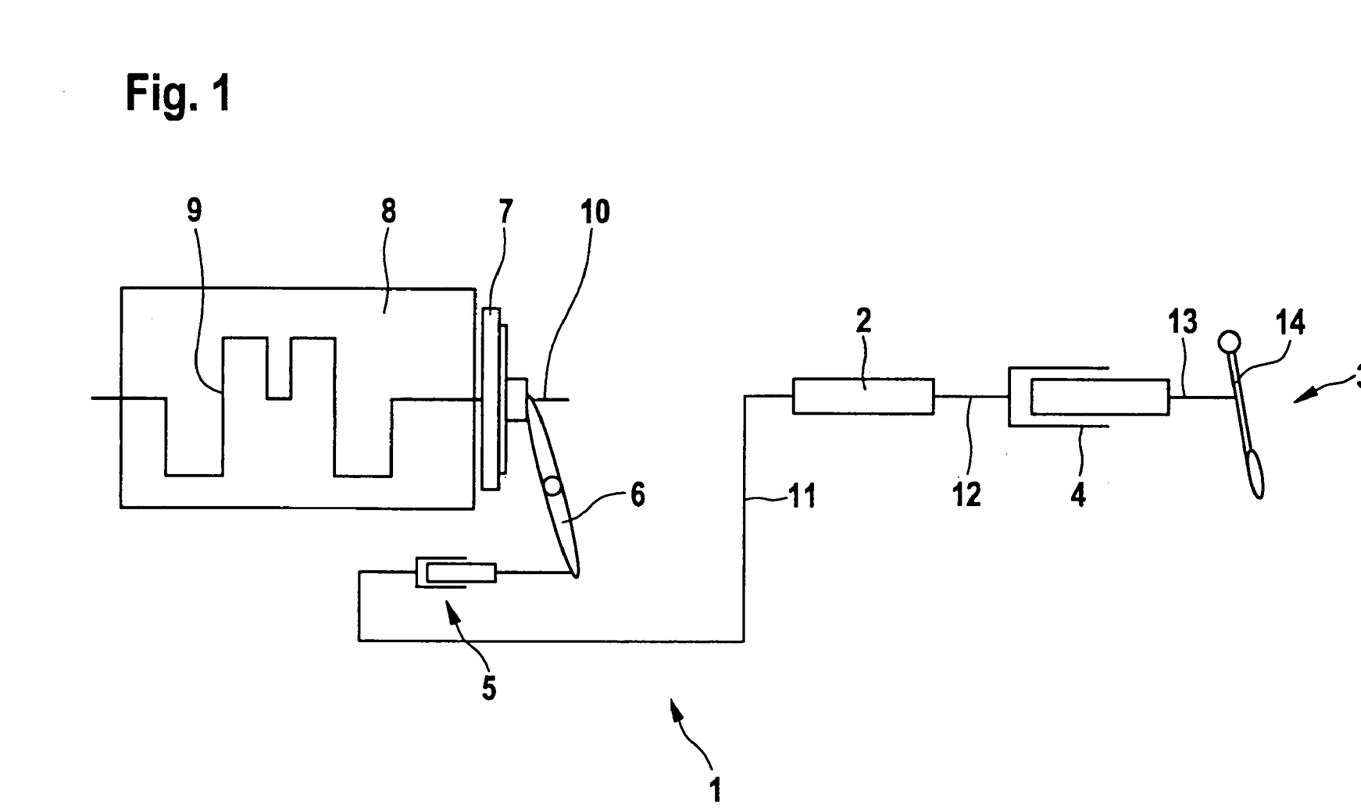
FIG. 1 is a schematic representation of a hydraulic system based on an exemplary embodiment of a clutch release device.

In FIG. 1, a possible embodiment of a hydraulic system having a pressure-limiting valve or damping element 2 is schematically shown through a clutch release device 3 including a master cylinder 4 and a slave cylinder 5. In the exemplary embodiment shown, pressure-limiting valve 2 is installed in line sections 11 and 12, separating them from each other in an unopened condition. It is to be understood that in other exemplary embodiments, pressure-limiting valve 2 can be integrated into master cylinder 4 or into slave cylinder 5, and in other hydraulic systems, such as brake systems, power steering systems, and the like, it can be integrated into a functional component. Furthermore, a pressure-limiting valve according to the present invention can be used in an advantageous manner in any hydraulic line system as a pressure-limiting valve and/or as a vibration filter, such as a so-called "pulsation filter".

Clutch release system 3 hydraulically operates clutch 7 by acting upon master cylinder 4 through an actuating member 14, which can be a foot pedal, an actuator such as an electric actuator, or the like. In this manner, pressure is built up in master cylinder 4 by a mechanical transmission device 13. Master cylinder 4 builds up pressure in slave cylinder 5 via line section 12, pressure-limiting valve 2, and line section 11. Slave cylinder 5 can be arranged concentrically around a transmission input shaft 10 and be axially supported on a transmission housing, and is able to apply the necessary release force to clutch 7 via a release bearing, or to the release elements of the clutch, such as the disk spring. As shown in FIG. 1, further embodiments can provide for a slave cylinder 5, which actuates a disengagement element via a disengagement mechanism 6, and which is located outside the clutch bell. The slave cylinder 5 acts upon the disengagement mechanism 6 in an axial direction using a piston which is in hydraulic communication with the master cylinder 4 and accommodated in the slave cylinder housing. To apply the release force, the slave cylinder 5 may be immovably secured to the transmission housing, or to another component that is immovable relative to the housing. When clutch 7 is closed, transmission input shaft 10 transmits the torque of internal combustion engine 8 to a transmission, and then to the drive wheels of a motor vehicle.

Crankshaft 9 experiences irregular loading as a result of the combustion processes in internal combustion engine 8 and as a function of the design of internal combustion engine 8, depending, for example, on the number of cylinders. The irregular loads are manifested as axial and/or wobbling vibrations and are transmitted through disengagement mechanism 6 to slave cylinder 5, and through line system 11, 12, to master cylinder 4, and from there through mechanical transmission device 13 to actuating member 14. If the actuating member is a clutch pedal, these vibrations are perceived as an annoyance. In case the actuating member 14 is an actuator, such vibrations can result in, for example, reduced control accuracy, or a shortened service life. Pressure-limiting valve 2 is therefore inserted in lines 11, 12 for damping purposes, and tuned to damp the vibrations introduced by crankshaft 9. Such vibrations typically fall in the frequency range of 50 to 200 Hz.

Figure 2:
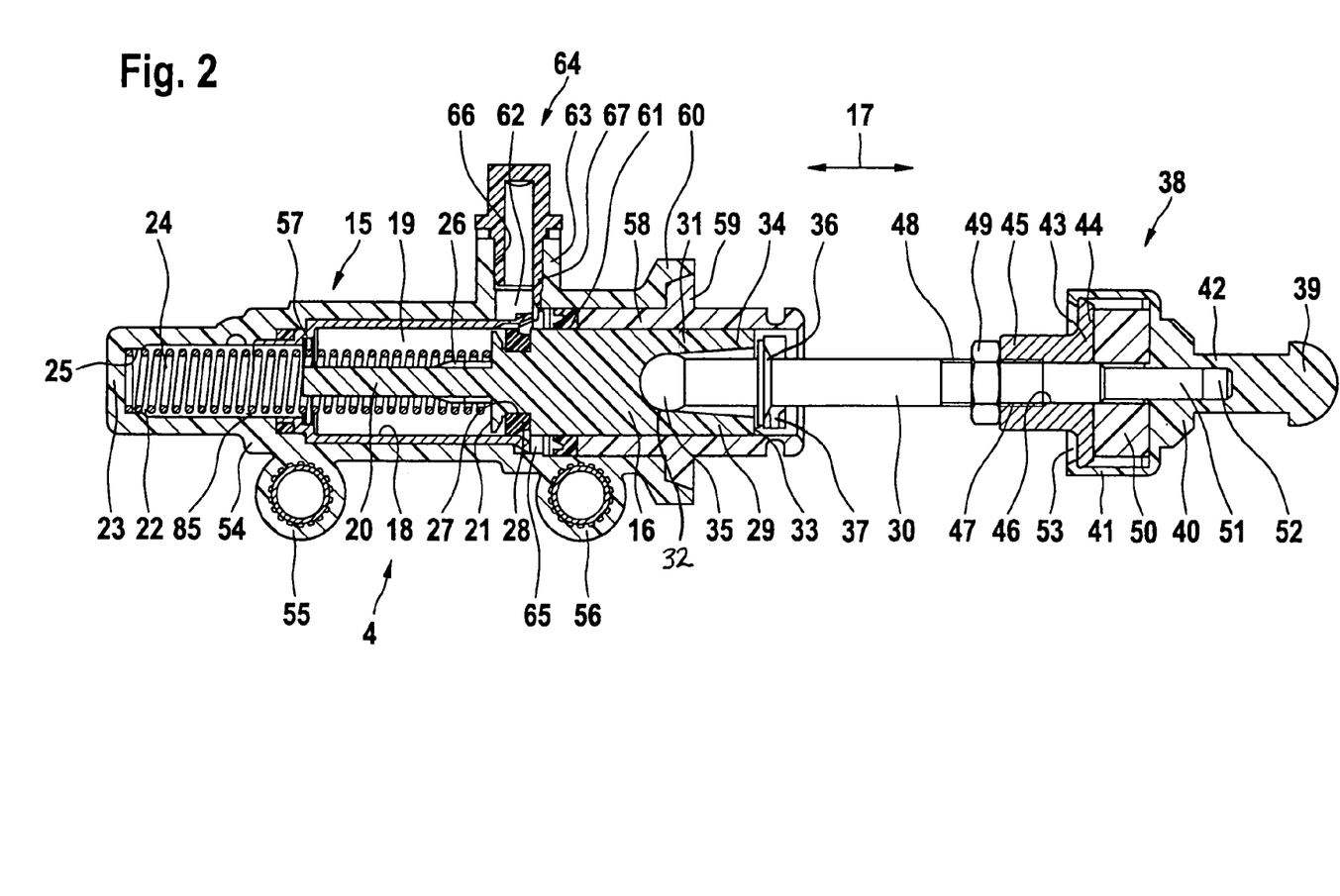
FIG. 2 is a longitudinal section of a master cylinder in a first position.

FIG. 2 is a longitudinal section of a master cylinder 4 in a first position. Master cylinder 4 includes a housing 15 and a piston 16 which is axially movably disposed therein. In FIG. 2, the axial direction is defined by a double arrow 17. Piston 16 includes a piston body, which is usually made of plastic, for example, by injection molding or the like, and which may include a piston sleeve, which substantially surrounds the piston body at its periphery and which can be made of a metal. In the present exemplary embodiment, piston 16 is made completely of plastic. The substantially cylindrical piston 16 is located in a cylinder bore 18 within housing 15. Piston 16, together with housing 15 or cylinder bore 18, forms a pressure chamber 19. Piston 16 has an extension 20, which may be substantially cylindrical in shape and arranged coaxially with the piston, and which extends from a piston crown 21 in the direction of pressure chamber 19. Pressure chamber 19 is enlarged by an auxiliary chamber 22 on the side facing piston 16. A biasing spring 24 is arranged between a bottom 23 of auxiliary chamber 22 and piston crown 21. The inside diameter of auxiliary chamber 22 is reduced in the region of bottom 23 and is approximately equal to the outside diameter of biasing spring 24. The spring retainer 25 formed in this manner secures spring 24 both axially and against rotation. The inside diameter of the remaining region of auxiliary chamber 22 is slightly greater than the outside diameter of spring 24, both in the unloaded and loaded condition of spring 24. In the region of piston crown 21, extension 20 has enlarged portions 26 which prevent excessive radial play of biasing spring 24 with respect to extension 20. Extension 20, first of all, serves to guide biasing spring 24 and prevents kinking or the like during compression of spring 24; secondly, the extension reduces the total volume of pressure chamber 19. The length of pressure chamber 19, in conjunction with auxiliary chamber 22, is a function of the desired spring force and the desired characteristic of the spring force. Therefore, the length of biasing spring 24 cannot be shortened arbitrarily. The volume of auxiliary chamber 22, which is per se almost irrelevant to the function of the master cylinder, is compensated in this way.

Figure 7:
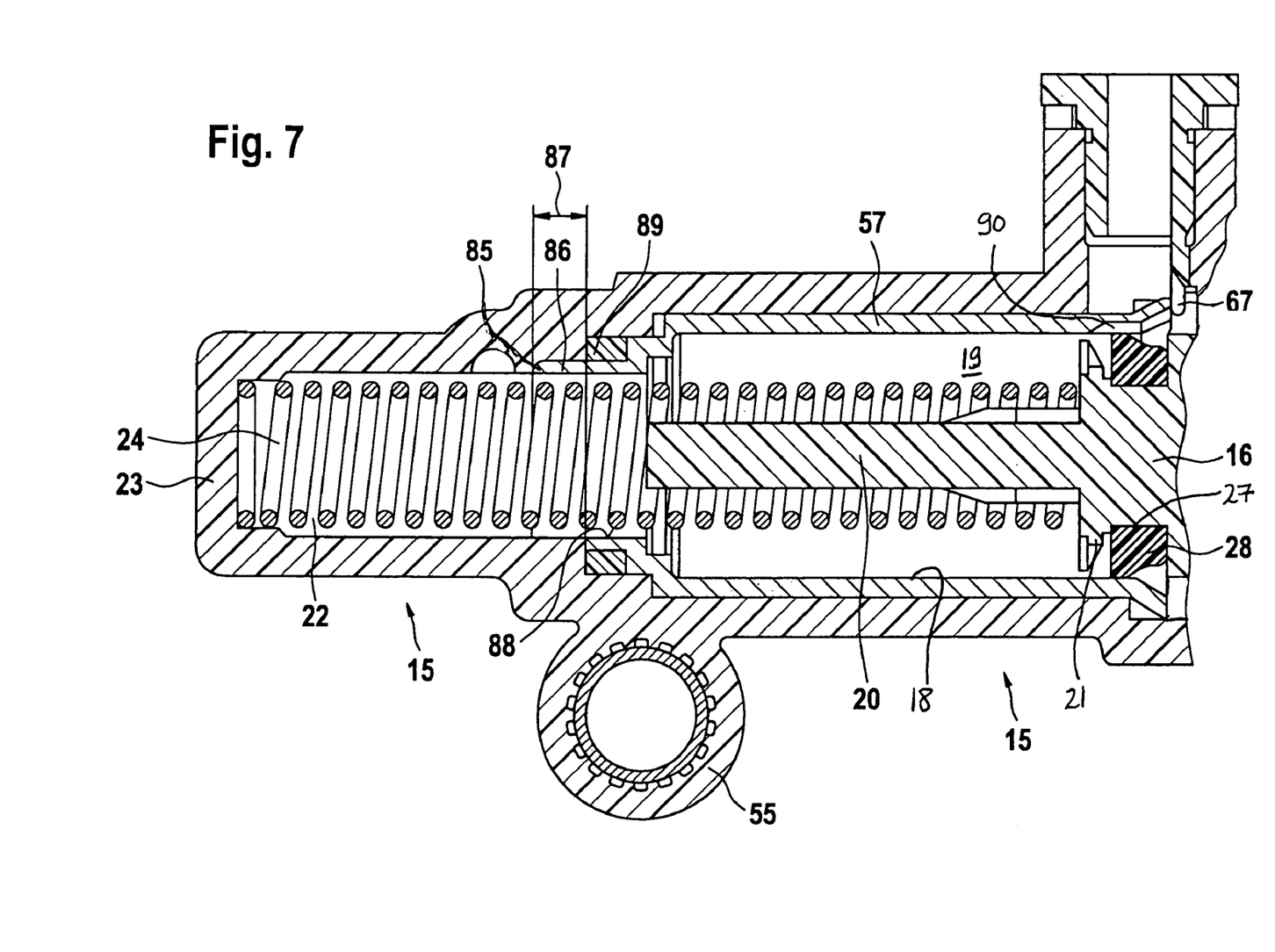
FIG. 7 shows an enlarged detail of the front region of the master cylinder of FIG. 2.

As seen in FIG. 7, cylinder sleeve 57 is asymmetrical in shape at its front end 85 facing auxiliary chamber 22, and has a nose 86 projecting beyond end face 88 of cylinder sleeve 57 by an overlength 87. The shape of the inner contour of housing 15 is matched to the outer contour of sleeve 57 so that nose 86 engages, for example, in a corresponding recess of housing 15. Nose 86 prevents rotation of the cylinder sleeve 57 about its longitudinal axis. A seal 89 seals cylinder sleeve 57 against housing 15. Cylinder sleeve 57 must be secured against rotation to ensure the correct position of breather port 90 or the breather grooves integrated therein with respect to replenishing chamber 65.

Piston 16 has a circumferential annular groove 27 which is located immediately behind piston crown 21 and accommodates a substantially circumferential primary seal 28. Primary seal 28 serves to seal piston 16 against cylinder bore 18 when piston 16 is actuated. In a rear region 29 of piston 16, as shown in FIG. 2, a piston rod 30 is supported by a spherical segment 31. Spherical segment 31 is formed by a spherical recess 32 which extends toward a rear edge 33 of piston 16 in the form of a widening truncated cone 34. The mating part of spherical recess 32 is a ball head 35 of piston rod 30. Piston rod 30 also has a stop disk 36 which, when in the installed position, is only slightly spaced from rear edge 33. The clearance is selected in such a manner that piston rod 30 can be slightly rotated in the drawing plane of FIG. 2, or perpendicularly to the drawing plane of FIG. 2, as far as allowed by truncated cone 34 without stop disk 36 touching rear edge 33 of piston 16. In the rear position, which is shown in FIG. 2, stop disk 36 hits a stop 37 which is fixedly connected to housing 15, thus preventing piston 16 from being completely pulled out.

Piston rod 30 also includes a damping element 38. Damping element 38 is connected to a connecting piece 39 which, in the case of manual actuation, is directly connected to a clutch or brake pedal.

The following is a more detailed description of the construction of damping element 38. The damping element 38 includes a first damper element 40 composed of a cup-shaped first region 41 and a substantially cylindrical second region 42. Connecting piece 39 is located at second region 42; first region 41, second region 42, and connecting piece 39 being integrally formed of, for example, plastic. Alternatively, these individual parts can also be manufactured separately, and be detachably or permanently connected to each other, for example, by bonding, or welding, or screwing. Damping element 38 also includes a second damper element 43, which is composed of a substantially disk-shaped region 44 and a receiving flange 45. Second damper element 43 can be made, for example, of plastic by injection molding or of metal, and be manufactured in one piece, for example, by turning. A through-bore 46 is provided in receiving flange 45 and disk-shaped region 44. The through-bore 46 is provided with an internal thread 47, which corresponds to a matching external thread 48 of piston rod 30. Thus, second damper element 43 can be screwed onto piston rod 30. A lock nut 49 fixes second damper element 43 with respect to piston rod 30.

A damping cushion 50 is located between first damper element 40 and second damper element 43. The damping cushion 50 is a substantially circular torus of rectangular cross-section, as can be directly seen from FIG. 2. Damping cushion 50 can be manufactured, for example, from a plastic, rubber, or other materials having good damping characteristics. A pin 51 of piston rod 30 extends through second damper element 43 and damping cushion 50 into a bore 52 of first damping element 40. The fit between pin 51 and bore 52 is selected such that pin 51 is supported in bore 52 in such a manner that pin 51 can freely move in an axial direction. The cup-shaped first region 41 of first damping element 40 wraps around disk-shaped region 44 of second damper element 43. For this purpose, first region 41 has an undercut 53, which allows first damper element 40 to be clipped over second damper element 43 during assembly. First damper element 40 is axially movable relative to second damper element 43 against the restoring or damping force exerted by damping cushion 50. In this context, after assembly undercut 53 forms a stop which prevents first damper element 40 from being pulled off the second damper element 43. All aforementioned components of damping element 38, in particular first damper element 40 and second damper element 43 are preferably made of plastic.

Housing 15 includes a first housing part 54 on which are located a first housing flange 55 and a second housing flange 56. Housing 15 further includes a cylinder sleeve 57 located within first housing part 54, mainly in the region of pressure chamber 19. Furthermore, housing 15 includes a weld flange 58 which is connected to a flange socket 60 of housing 15 by a flange 59. Flange 59 and flange socket 60 can be joined together by screwing, bonding, or welding, for example, by ultrasonic welding. First housing part 54 and weld flange 58 are preferably made of plastic and thus the welding, if used in this case, is plastic welding. Cylinder sleeve 57 is preferably made of metal. However, other material pairs of the housing parts and sleeve 57, such as plastic—plastic, are also conceivable. The inside diameter of cylinder sleeve 57 and the inside diameter of weld flange 58 correspond to the outside diameter of piston 16. At the end face of weld flange 58 on the side of the housing, there is located a secondary seal 61. This seal 61 is a peripheral seal which serves to seal the actually non-pressurized region from the environment.

Housing 15 is provided with a replenishing port 62 which is connected to a replenishing nozzle 64 by a replenishing flange 63. Replenishing nozzle 64 is connected to a replenishing reservoir via a supply line.

Between secondary seal 61 and primary seal 28, there remains a replenishing chamber 65. During operation of master cylinder 4, pressure chamber 19, replenishing chamber 65, replenishing port 62, and associated parts are filled with a hydraulic fluid. The replenishing line, and thus also replenishing chamber 65, are essentially at ambient pressure. When master cylinder 4 is in the rear position, which is shown in FIG. 2, pressure chamber 19 is directly connected to replenishing chamber 65 via a so-called "breather clearance" between primary seal 28 and cylinder bore or sleeve 57. In this manner, hydraulic fluid lost due to leaks in the overall system or other losses can be replenished automatically.

Figure 3:
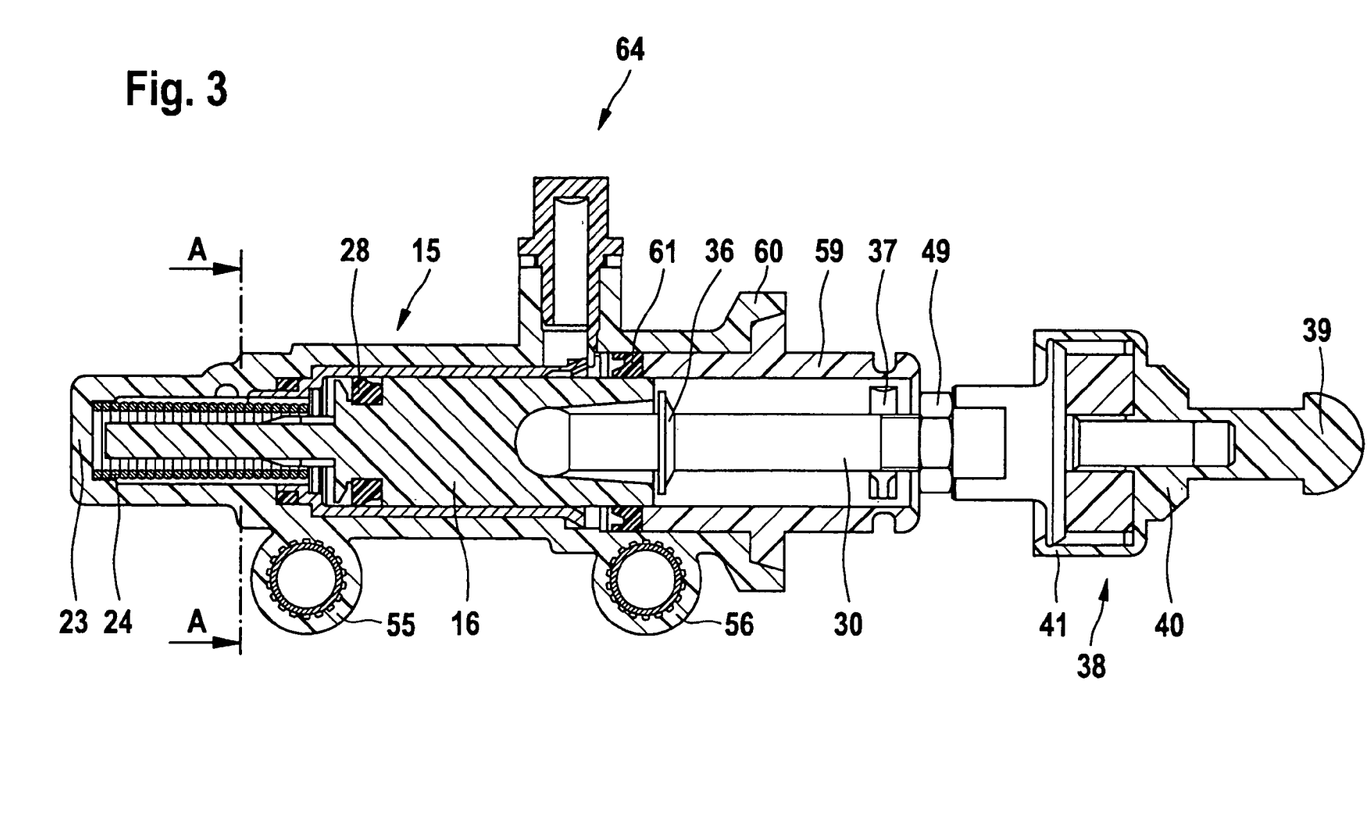
FIG. 3 is a longitudinal section of the master cylinder of FIG. 2 in a second position.
Figure 6:
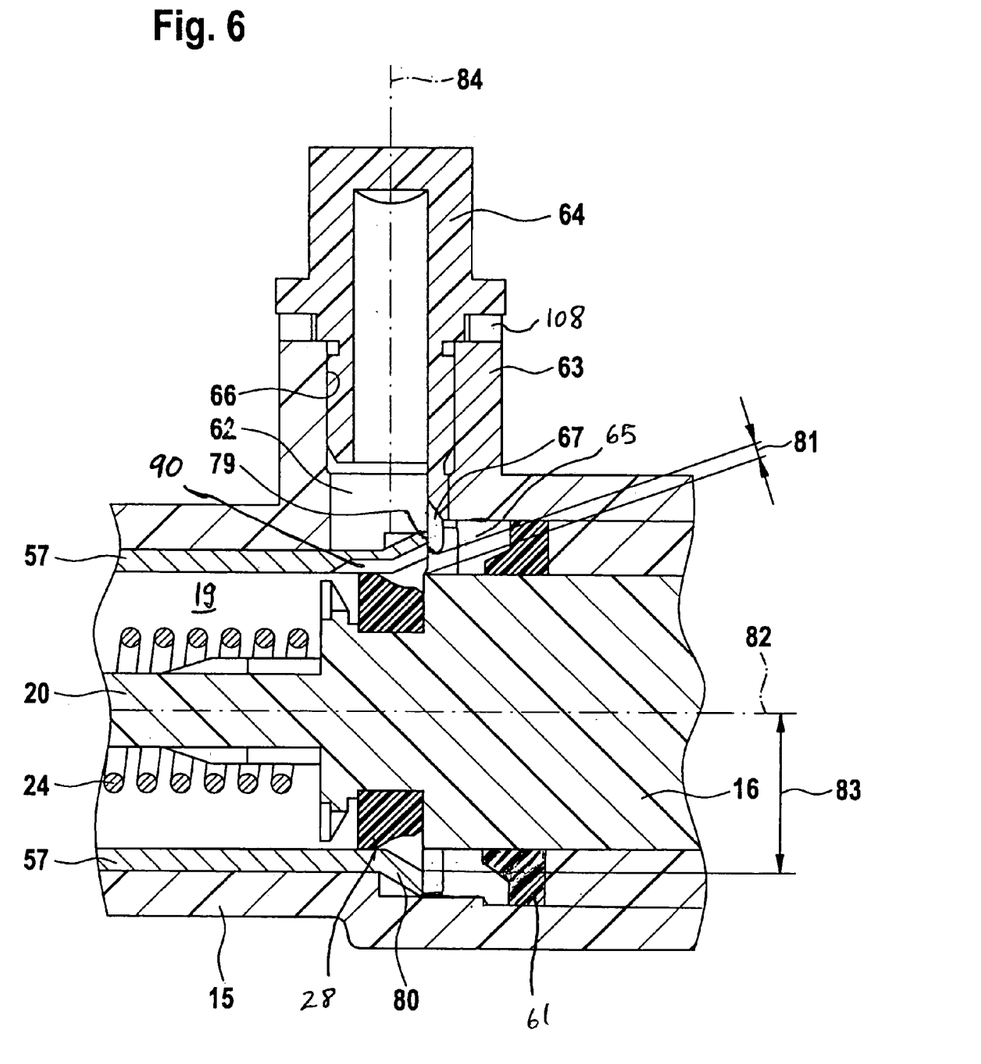
FIG. 6 shows an enlarged detail of the replenishing nozzle of FIG. 2.

FIG. 6 shows an enlarged detail of replenishing nozzle 64. Replenishing nozzle 64 is pressed into replenishing flange 63. On the side of replenishing nozzle 64 facing piston 16, there is arranged a projection 67. As can be seen in FIGS. 2, 3 and 6, projection 67 extends beyond a substantially cylindrical or truncated-cone-shaped slip socket 66, and so far into housing 15 that it reaches down to the level of cylinder sleeve 57 in a radial direction with respect to the direction of movement of piston 16, and that it touches a contact surface 79 or that it partially reaches in a radial direction behind cylinder sleeve 57. Cylinder sleeve 57 has a radially outwardly enlarged collar 80. Thus, it is sufficient for projection 67 to reach to inside diameter 83 of collar 80 in a radial direction with respect to axis of rotation 82 of piston 16, thus leaving a gap 81 between piston 16 and projection 67. The position of projection 67 with respect to longitudinal axis 84 of slip socket 66 is on the side of slip socket 66 or replenishing nozzle 64 facing away from pressure chamber 19. Projection 67 prevents cylinder sleeve 57 from being pulled out of housing 15, especially during transport prior to the final assembly of master cylinder 4, i.e., when piston 16 is not yet installed. Moreover, projection 67 secures replenishing nozzle 64 against rotation. Projection 67 is essentially a flat plate, or it is circularly curved to match the inside diameter of replenishing nozzle 64. When attempting to rotate replenishing nozzle 64, projection 67 butts against cylinder sleeve 57 with one of its outer edges, preventing rotation. Located on replenishing nozzle 64 is a ring 108 which limits the insertion depth of replenishing nozzle 64 into replenishing flange 63. Ring 108 can additionally be welded or bonded to replenishing flange 63.

FIG. 3 shows master cylinder 4 in the end position, where it is completely pressed in. Here, many of the reference numerals were omitted for the sake of clarity. It can be clearly seen that piston 16 and extension 20 fill virtually the entire pressure chamber 19, which is why only small amounts of hydraulic fluid need to be used.

Figure 4:
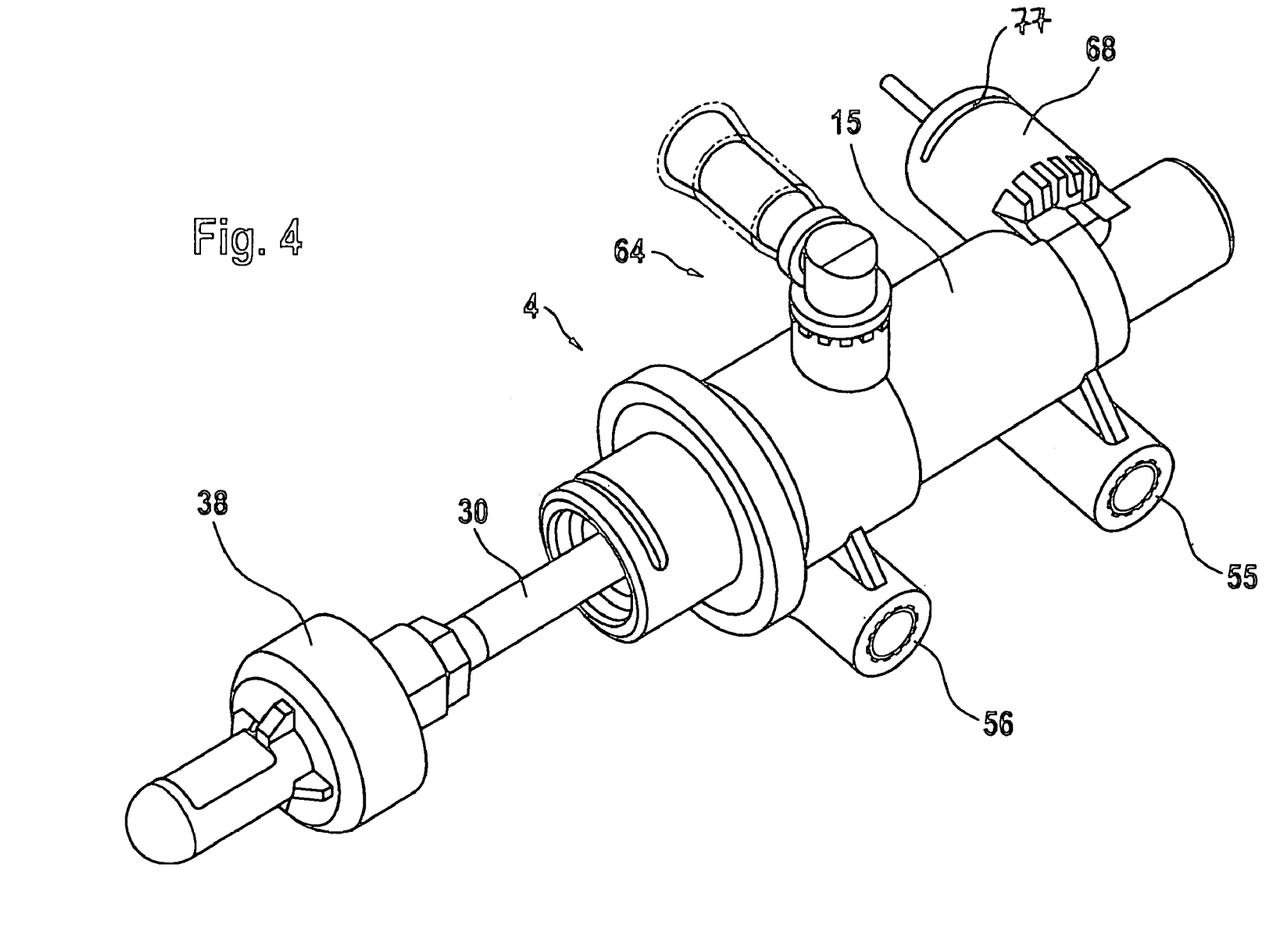
FIG. 4 shows the master cylinder in a three-dimensional representation.

To illustrate the spatial arrangement of the individual elements, FIG. 4 shows the master cylinder according to the present invention in a three-dimensional representation. For the sake of simplicity, only housing 15, piston rod 30, as well as damping element 38, first housing flange 55, second housing flange 56, and replenishing line 64 are provided with reference numerals here.

An adapter 68 for connection of the line sections 11 or 12 is located laterally on housing 15 in the front region of pressure chamber 19.

Figure 5:
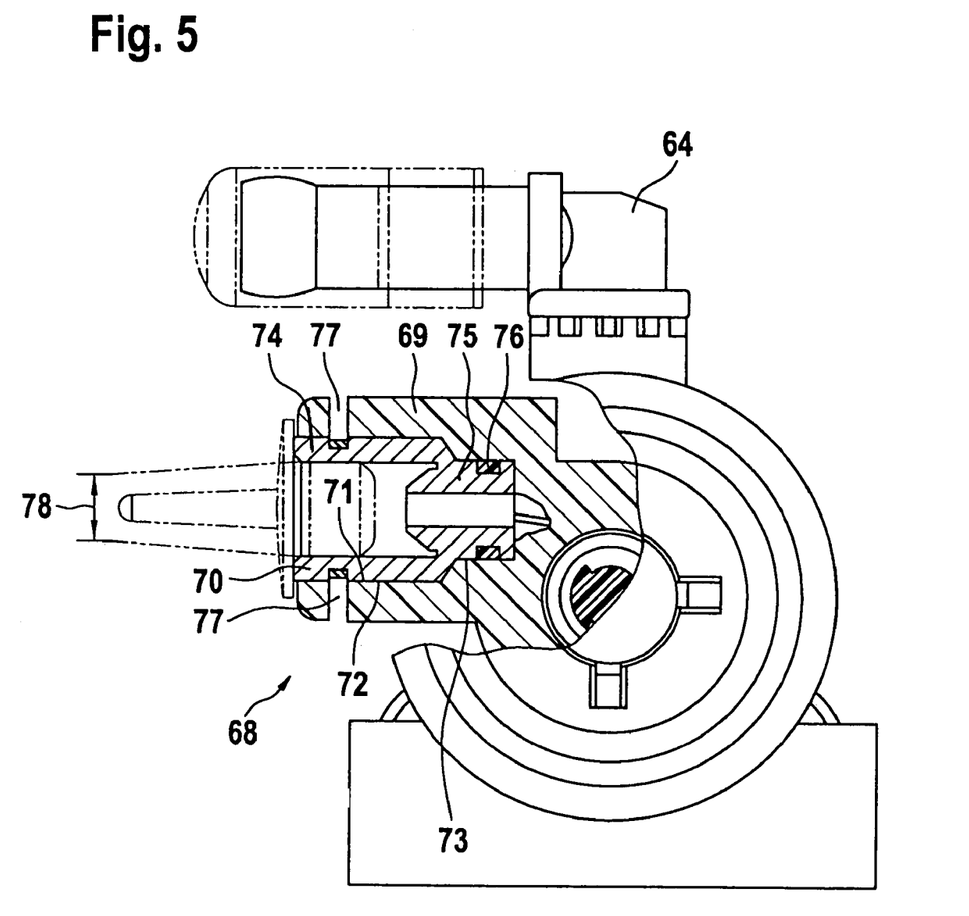
FIG. 5 is end view toward line A—A in FIG. 3.

FIG. 5 shows adapter 68 in a section along line A—A in FIG. 3. Housing 15 includes a housing projection 69 in which is located a an adapter 68 including a sleeve 70. Sleeve 70 is preferably a metal sleeve. Projection 69 includes a stepped bore 71 having a first step 72 of a larger diameter and a second step 73 of a smaller diameter. Sleeve 70 also has a first region 74 with an outside diameter approximately equal to the inside diameter of first step 72, as well as a second region 75 whose outside diameter is approximately equal to the inside diameter of second step 73. An annular seal 76 is located between second region 75 and second step 73. The annular seal can be, for example, a plastic seal or the like, which swells upon contact with the hydraulic fluid. Alternatively, it is possible to use other known seals. Preferably, second region 75 and, accordingly, second step 73 are approximately circular in cross-section. In contrast, first step 72 and, accordingly, first region 74 have corresponding, polygonal cross-sections. For example, a rectangular, hexagonal or octagonal cross-section can be used here. The polygonal cross-section prevents rotation of sleeve 70 with respect to projection 69. First step 72 and second step 73 of stepped bore 71 can each have a circular inside diameter. In this case, sleeve 70 is pressed into stepped bore 71 with the polygonal sections, thereby creating corresponding, polygonal cross-sections of stepped bore 71. Inside diameter 78 of sleeve 70 is circular, and serves to receive, in known manner, a hydraulic connector of line section 12, which is then in fluid connection with pressure chamber 19.

In known manner, projection 69 and sleeve 70 have a double groove 77 (see FIG. 4 as well) to receive a clamping spring when connecting a pressure-medium line.

FIG. 6 shows an enlarged detail of FIG. 2 in the region of nozzle 64, and FIG. 7 is an enlarged detail of the front region of the master cylinder of FIG. 2.

Figure 8:
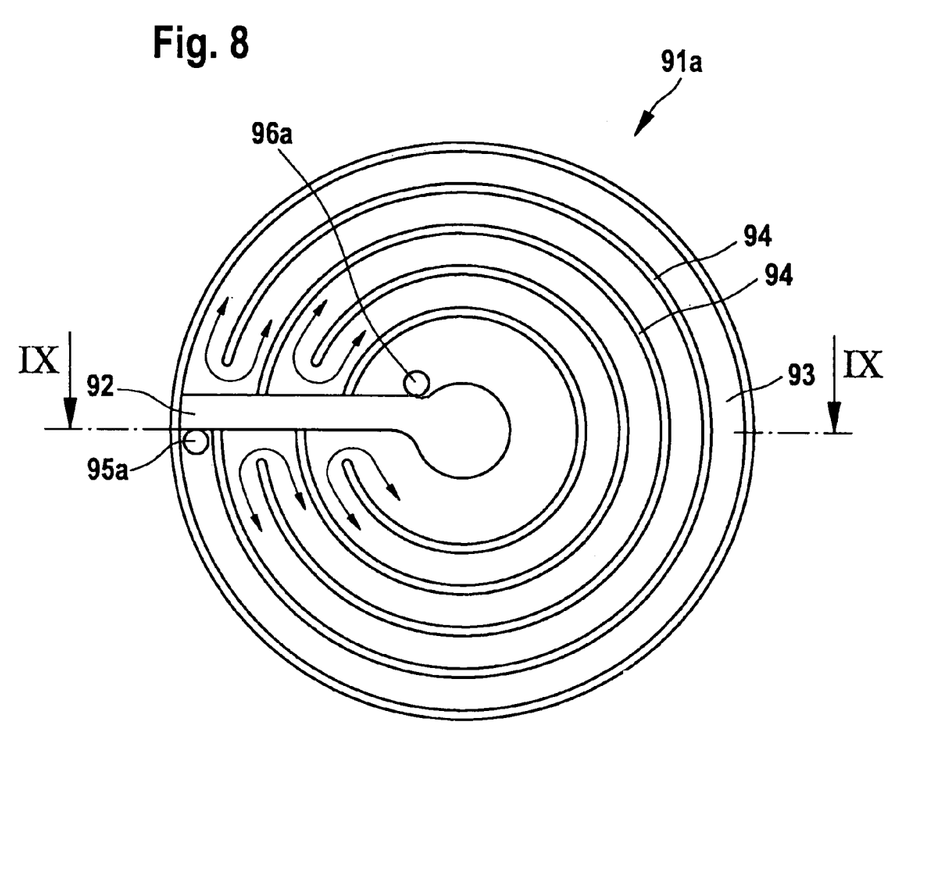
FIG. 8 shows an embodiment of a damping device in the form of a disk.

FIG. 8 shows a damping device 2 in the form of a disk 91a. This damping device is inserted in the pressure-medium line and connected to lines sections 11 and 12 by its bores 95a and 96a. As the vibration-carrying fluid flows through disk 91a, it is positively guided, starting from the entry, for example, through bore 95a, along annular grooves 93 until it is passed on to the system through bore 96a. Ridges 94 alternate between ending at spline 92 and ending short of spline 92. The damping of the vibrations is accomplished over the groove path, which constitutes an extension of the path of the pressure medium.

Figure 9:
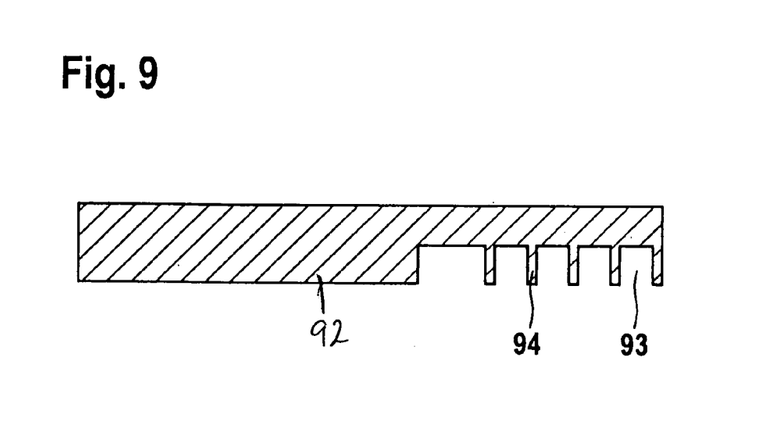
FIG. 9 is a section through the damping device according to FIG. 8.

FIG. 9 is a cross-section of disk 91a, showing the profile thereof. Ridges 94 alternate with grooves 93.

Figure 10:
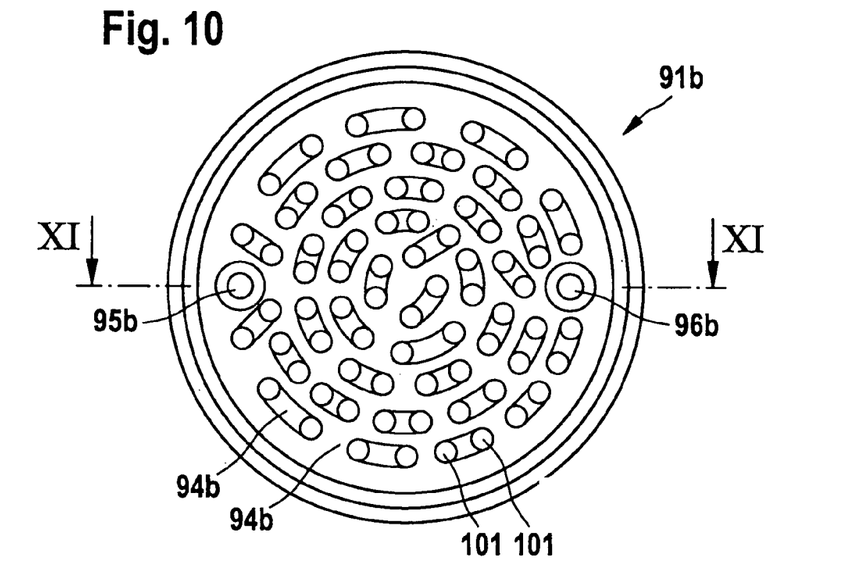
FIG. 10 shows an embodiment of a damping device in the form of a labyrinth body.

FIG. 10 shows a different embodiment of a damping device 2. Here, a labyrinth body 91b including a housing 97 (FIG. 11) and a cylinder, which is provided with bores extending in an axial direction and which is sealed and closed with a cover 100, is inserted in one of line sections 11 or 12. This cover, in turn, is connected to the line system via bores 95b and 96b. This embodiment represents a further way of extending the path of the pressure medium. Starting from the entry of the pressure medium, for example, through bore 95b, the pressure medium is positively guided in labyrinth body 91b in the bores 101.

Figure 11:
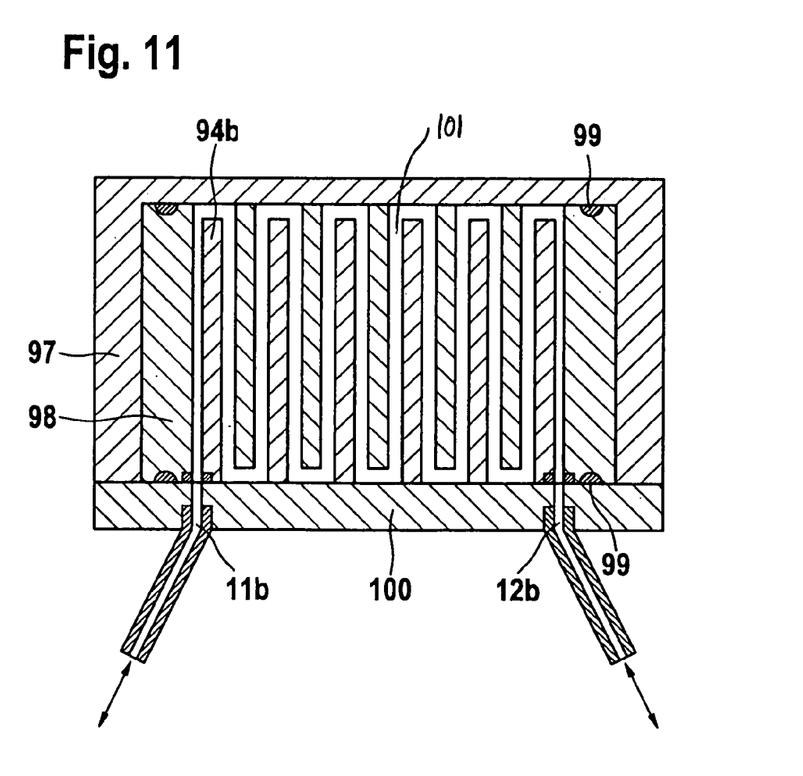
FIG. 11 is a section through the damping device according to FIG. 10.

For purposes of illustration, FIG. 11 shows the labyrinth body 91b in cross-section.

Figure 12:
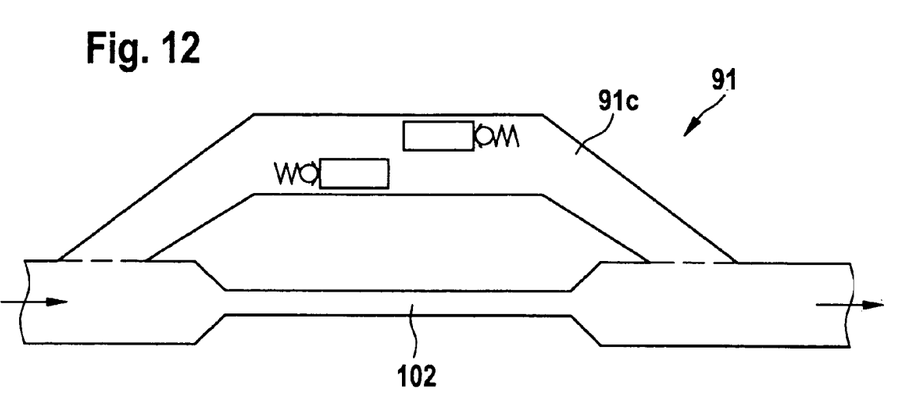
FIG. 12 is a schematic representation of an embodiment of a damping device as a combination of a pulsation filter and a throttle.

FIG. 12 is a schematic representation of a damping device 91 with the combination of a pulsation filter 91c and a throttle 102, which, in the exemplary embodiment, is designed as a laminar throttle.

Figure 13:
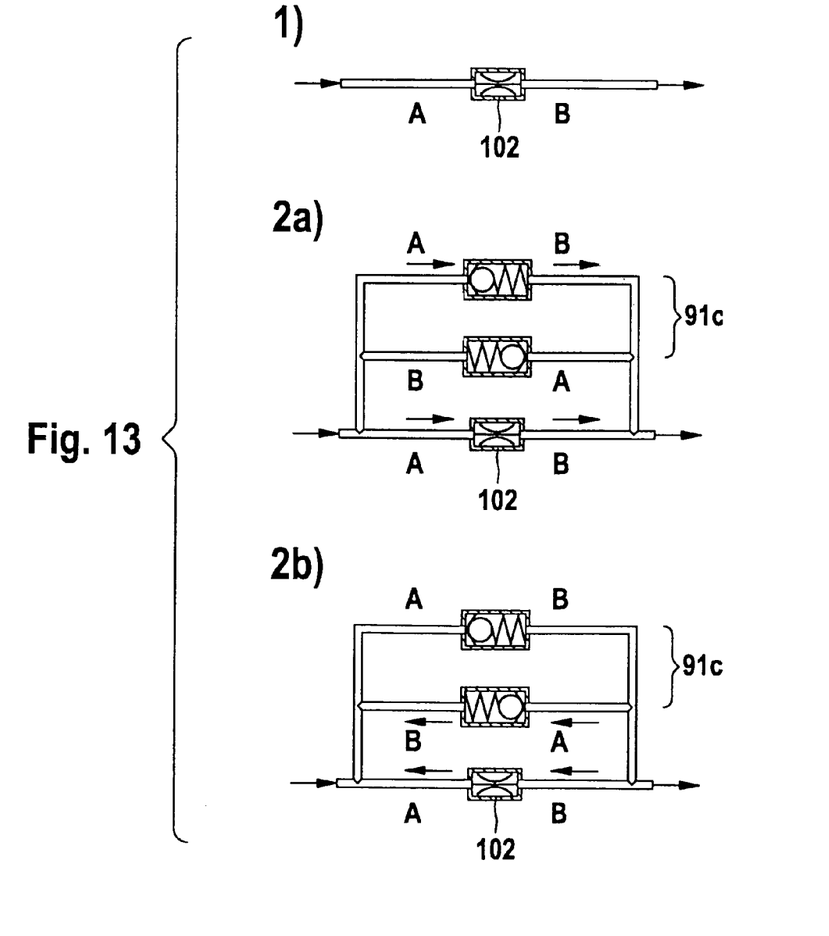
FIG. 13 shows oil flow passageways through the damping device according to FIG. 12.

The different passageways of the fluid through the damping device according to FIG. 12 can be seen in FIG. 13. When pulsation filter 91c is closed, the fluid flows only through throttle 102, which follows from step 1). When the fluid coming from the engine exceeds a certain pressure, a valve of pulsation filter 91c opens as well, and the fluid flows through pulsation filter 91c in the direction of the actuating device, as shown in FIG. 13 2a). The opposite case is obvious from 2b). That is, when the actuating device is actuated, the fluid flows through throttle 102 and through a valve of pulsation filter 91c.

LIST OF REFERENCE NUMERALS 1 hydraulic system
2 pressure-limiting valve or damping element
3 clutch release device
4 master cylinder
5 slave cylinder
6 disengagement mechanism
7 clutch
8 internal combustion engine
9 crankshaft
10 transmission input shaft
11 line section
12 line section
13 mechanical transmission means
14 actuating member
15 housing
16 piston
17 double arrow for the axial direction
18 cylinder bore
19 pressure chamber
20 extension
21 piston crown
22 auxiliary chamber
23 bottom
24 biasing spring
25 spring retainer
26 enlarged portion
27 annular groove
28 primary seal
29 rear region
30 piston rod
31 spherical segment
32 spherical recess
33 rear edge
34 truncated cone
35 ball head
36 stop disk
37 stop
38 damping element
39 connecting piece
40 first damper element
41 first region
42 second region
43 second damper element
44 disk-shaped region
45 receiving flange
46 through-bore
47 internal thread
48 external thread
49 lock nut
50 damping cushion
51 pin
52 bore
53 undercut
54 first housing part
55 first housing flange
56 second housing flange
57 cylinder sleeve
58 weld flange
59 flange
60 flange socket
61 secondary seal
62 replenishing port
63 replenishing flange
64 replenishing nozzle
65 replenishing chamber
66 slip socket
67 projection
68 adapter
69 housing flange
70 sleeve
71 stepped bore
72 first step
73 second step
74 first region
75 second region
76 annular seal
77 double groove
78 inside diameter
79 contact surface
80 collar
81 gap between piston 16 and projection 67
82 axis of rotation of piston 16
83 inside diameter
84 longitudinal axis of the slip socket 66
85 front end
86 nose
87 overlength
88 end face
89 seal
90 breather port/groove
91 damping element
91a disk
91b labyrinth body
91c pulsation filter
92 spline
93 annular groove
94 ridges
94a grooves
94b walls
95a bore extending perpendicularly
95b bore extending perpendicularly
96a bore extending axially
96b bore extending axially
97 housing
98 cylinder
99 seals
100 cover
101 bores
102 laminar throttle
108 ring

What is claimed is:

1. A hydraulic system comprising:
a master cylinder having a housing, a piston axially movably disposed in the housing, and a piston rod, the piston bounding a pressure chamber filled with a hydraulic fluid, the piston upon actuation of the master cylinder being axially moved by the piston rod to pressurize the hydraulic fluid, the housing having a projection;

a slave cylinder;

a pressure-medium line connecting the master cylinder and slave cylinder; and an adapter for detachable connection to the pressure-medium line, the adapter including a sleeve made of a metal, the projection having a stepped bore with an opening for receiving the sleeve and having a first step and a second step, the first step having a diameter larger than the second step, the sleeve having a first region and a second region with a smaller diameter than the first region, the first region having at least a polygonal outer cross-section connected to the first step, the second region being connected to the second step;

wherein the first region is further away from the pressure chamber than the second region.

2. The hydraulic system as recited in claim 1 wherein the polygonal outer cross-section fixes the sleeve against rotation in the stepped bore.

3. The hydraulic system as recited in claim 1 wherein the first step of the stepped bore has, at least partially, a polygonal bore cross-section.

4. The hydraulic system as recited in claim 1 wherein the second region has a round outer cross-section.

5. The hydraulic system as recited in claim 1 wherein the master cylinder includes an annular seal sealing the sleeve from the environment.

6. The hydraulic system as recited in claim 1 wherein the projection is located laterally on the housing.

7. The hydraulic system as recited in claim 1 wherein the sleeve is detachably connected to the housing.

8. The hydraulic system as recited in claim 1 wherein the sleeve is fixedly connected to the housing.

9. The hydraulic system as recited in claim 1 wherein the hydraulic system is a motor vehicle hydraulic system.

10. A hydraulic system comprising:

a master cylinder having a housing, a piston axially movably disposed in the housing, and a piston rod, the piston bounding a pressure chamber filled with a hydraulic fluid, the piston upon actuation of the master cylinder being axially moved by the piston rod to pressurize the hydraulic fluid, the housing having a projection;

a slave cylinder;

a pressure-medium line connecting the master cylinder and slave cylinder; and an adapter for detachable connection to the pressure-medium line, the adapter including a sleeve made of a metal, the projection having a stepped bore with an opening for receiving the sleeve and having a first step and a second step, the first step having a diameter larger than the second step, the sleeve having a first region and a second region with a smaller diameter than the first region, the first region having at least a polygonal outer cross-section connected to the first step, the second region being connected to the second step;

wherein the sleeve is detachably connected to the housing.

11. The hydraulic system as recited in claim 10 wherein the polygonal outer cross-section fixes the sleeve against rotation in the stepped bore.

12. The hydraulic system as recited in claim 10 wherein the first step of the stepped bore has, at least partially, a polygonal bore cross-section.

13. The hydraulic system as recited in claim 10 wherein the second region has a round outer cross-section.

14. The hydraulic system as recited in claim 10 wherein the master cylinder includes an annular seal sealing the sleeve from the environment.

15. The hydraulic system as recited in claim 10 wherein the projection is located laterally on the housing.

16. The hydraulic system as recited in claim 10 wherein the hydraulic system is a motor vehicle hydraulic system.

* * * * *